United States Patent

Ryan et al.

[11] Patent Number: 6,117,015
[45] Date of Patent: Sep. 12, 2000

[54] ELASTOMERIC COUPLING WITH COMPOSITE SHOE

[75] Inventors: William E. Ryan, Sussex; Donald W. Hindman, Menomonee Falls, both of Wis.

[73] Assignee: Rexnord Corporation, Milwaukee, Wis.

[21] Appl. No.: 08/955,999

[22] Filed: Oct. 22, 1997

[51] Int. Cl.[7] .................................................. F16D 3/52
[52] U.S. Cl. ............................. 464/80; 464/178; 464/903
[58] Field of Search .................. 464/79, 80, 88, 464/87, 902, 903

[56] References Cited

U.S. PATENT DOCUMENTS

| | | | |
|---|---|---|---|
| 1,107,315 | 8/1914 | Krebbs | 464/903 |
| 1,501,187 | 7/1924 | Rayfield | 464/903 |
| 2,971,356 | 2/1961 | Reuter et al. | 464/903 |
| 3,178,906 | 4/1965 | Ricketts | 464/903 |
| 3,524,332 | 8/1970 | Callies | 464/80 |
| 3,702,545 | 11/1972 | Schlotmann et al. | 464/80 |
| 4,634,400 | 1/1987 | Butzow et al. | 464/88 |
| 5,318,480 | 6/1994 | Essi et al. | 464/175 |
| 5,611,732 | 3/1997 | Tirumalai | 464/80 |

FOREIGN PATENT DOCUMENTS

| | | | |
|---|---|---|---|
| 2653505 | 4/1991 | France | 464/80 |
| 159761 | 3/1979 | Netherlands | 464/80 |

*Primary Examiner*—Lynne H. Browne
*Assistant Examiner*—Grey Binda
*Attorney, Agent, or Firm*—Quarles & Brady LLP

[57] ABSTRACT

Disclosed herein is an elastomeric coupling for transmitting torque between two shafts approximately aligned on a shaft axis, which coupling comprises a composite member including an elastomeric center element, and a shoe fabricated from a reinforced plastic material and including a first portion bonded to the center element, and a second portion extending axially from the first portion and from the center element, including apertured metallic inserts, and being adapted to be connected to one of the shafts.

16 Claims, 1 Drawing Sheet

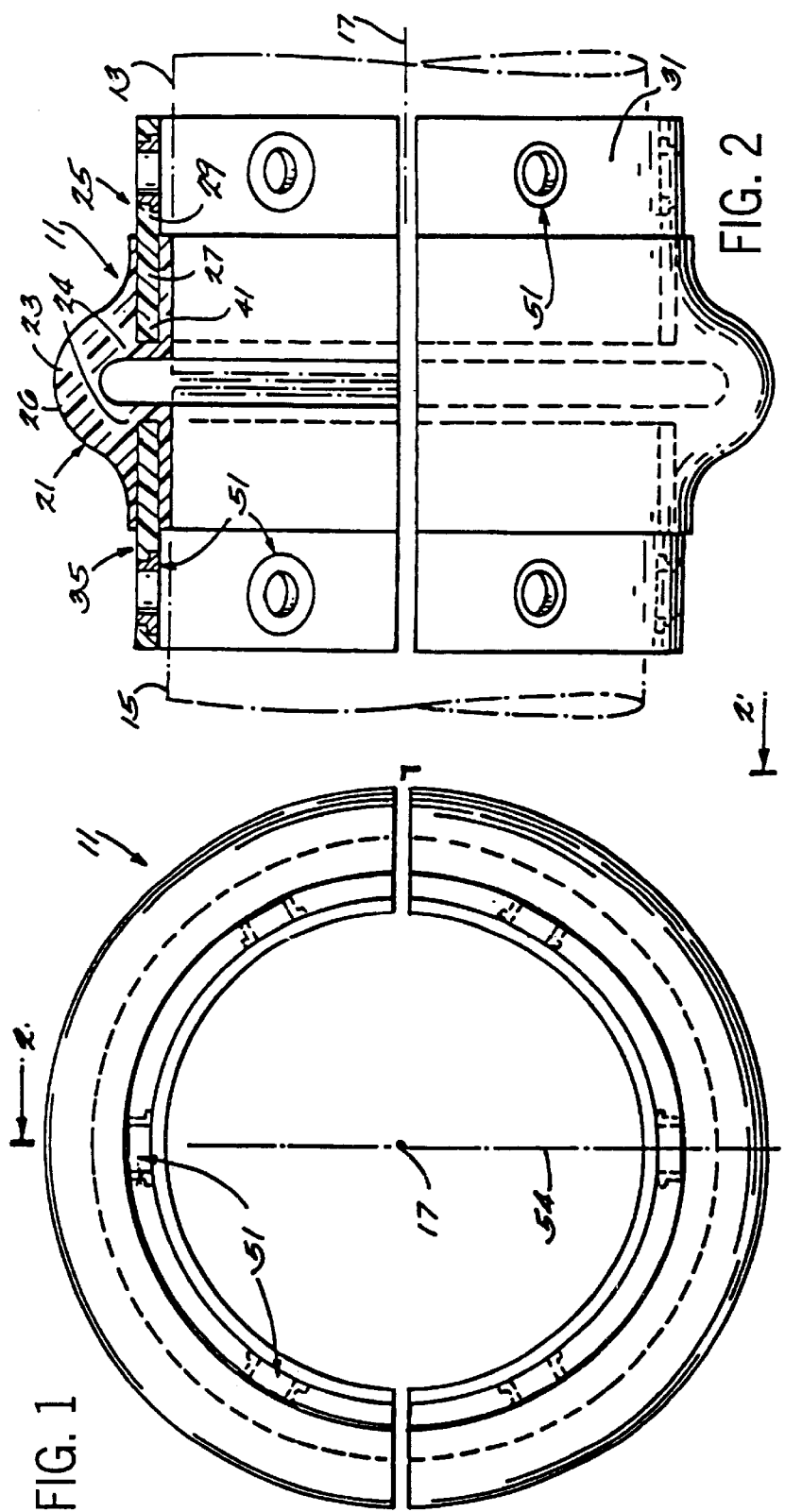

ELASTOMERIC COUPLING WITH COMPOSITE SHOE

RELATED APPLICATION

Attention is directed to copending U.S. application Ser. No. 09/120,948, filed Jul. 22, 1998 and entitled "Tearing Configuration for Flexible Element of Elastomeric Coupling" which is incorporated herein by reference.

BACKGROUND OF THE INVENTION

This invention relates to flexible shaft couplings, and more particularly, to elastomeric couplings for transmitting torque between two shafts approximately aligned on a shaft axis, i.e., to elastomeric couplings joining a pair of axially spaced shafts.

The invention further relates to such couplings which have annularly discontinuous elastomeric portions.

Attention is directed to U.S. Pat. No. 4,634,400, which issued Jan. 6, 1987 and which is incorporated herein by reference.

In the past, flexible shaft couplings employing elastomeric material have commonly also employed metallic shoes which were suitably bonded to the elastomeric material. The use of such steel shoes increased the weight of the flexible coupling, with consequent limitation on the rotational speeds of such couplings.

SUMMARY OF THE INVENTION

The invention provides an elastomeric coupling for transmitting torque between two shafts approximately aligned on a shaft axis, which coupling comprises a composite member including an elastomeric center element, and a shoe fabricated from a reinforced plastic material and including a first portion bonded to and located within the center element, and a second portion extending axially from the first portion and from the center element and adapted to be connected to one of the shafts.

The invention also provides an elastomeric coupling for transmitting torque between two shafts approximately aligned on a shaft axis, which coupling comprises a composite member including an elastomeric center element having, in a radial plane extending from and along the shaft axis, an inwardly opening generally U-shaped cross-section including a pair of spaced legs, and first and second shoes extending in opposite axial directions from the center element, fabricated from plastic material reinforced with fiber material, and respectively including a first tubular and cylindrical portion bonded within and to the legs of the center element and including an outer end, and a tubular and cylindrical second portion extending axially from the outer end of the first tubular and cylindrical portion, and including an outer end, and a plurality of inserts located axially inwardly of the outer end of the second portion and in arcuately spaced relation within a circular array, and respectively including a main part having a central aperture with an axis extending radially with respect to the shaft axis and adapted to receive a bolt which is adapted to be connected to one of the shafts.

Other features and advantages of the invention will become apparent to those skilled in the art upon review of the following detailed description, claims and drawings.

BRIEF DESCRIPTION OF THE DRAWINGS

FIG. 1 is an end view of one embodiment of a coupling incorporating various of the features of the invention.

FIG. 2 is a sectional view taken along line 2—2 of FIG. 1.

FIG. 3 is a fragmentary enlarged view of a portion of the coupling shown in FIG. 1.

FIG. 4 is a fragmentary enlarged view, similar to FIG. 3, of a portion of another embodiment of a coupling incorporating various of the features of the invention.

FIG. 5 is a partially broken away and sectioned perspective view of one of the inserts included in the fragmentarily views of FIGS. 3 and 4.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is an elastomeric coupling 11 for transmitting torque between first and second axially spaced and oppositely extending shafts 13 and 15 which are approximately aligned on a shaft axis 17.

While other constructions can be employed, in the particularly disclosed construction, the coupling 11 comprises a composite member 21 including an elastomeric center element 23, and at least one shoe 25 fabricated from a reinforced plastic material and having a first or axially inner portion 27 bonded to the center element 23, and a second or axially outer portion 29 extending axially from the first or axially inner portion 27 and from the center element 23, having an outer cylindrical surface 31, and adapted to be connected to one of the shafts 13 and 15. In the particularly disclosed embodiment, the shoe 25 is connected to the first shaft 13 and the coupling 11 also includes a second shoe 35 which is constructed generally identically to the shoe 25, which is bonded to the center element 23, and which is connected to the shaft 15.

More particularly, the elastomeric center element 23 includes an inwardly opening generally U-shaped cross-section which projects in a radial plane extending from and along the shaft axis 17. The elastomeric center element 23 can be of any suitable form and, while other constructions can be employed, in the particularly disclosed construction, the elastomeric center element 23 can be fabricated from any suitable elastomer, is preferably fabricated from polyurethane, and includes a pair of legs 24 which are axially spaced in the direction of the shaft axis 17 and in which the shoes 25 and 35 are buried and bonded to the center element 23, together with a suitable bridging portion 26 which connects the legs 24.

Any suitable arrangement known in the art can be employed to bond the axially inner portions 27 of the shoes 25 and 35 in the legs 24 of the center element 23. In the specifically disclosed construction, the shoes 25 and 35 are bonded to the center element 23 during molding of the center element 23 and, more specifically, during curing of the polyurethane.

While other constructions can be employed, in the particularly disclosed construction, the shoes 25 and 35 are, as already indicated, generally identically constructed. More particularly, the axially outer or second shoe portion 29 is located exteriorly of the center element 23 and is generally of tubular and cylindrical configuration, and the first or inner portion 27 is located within the associated one of the legs 24 of the center element 23 and includes a tubular cylindrical part 41 which extends axially inwardly from the inner end of the outer or second cylindrical portion 29.

In addition, the outer portion 29 of each of the shoes 25 and 35 also includes one or more metallic, generally identical inserts 51 which can be fabricated in any suitable manner, as for example, by machining, and which, preferably, are fabricated from a suitable powdered metal. The inserts 51 are located in arcuately spaced relation to one another in an arcuate array located closer to the axially outer end of the associated shoe than to the axially inner end thereof, and respectively include a cylindrical main portion or part 52 which, in part, is buried in the axially outer cylindrical portion 29 of the associated one of the shoes 25 and 35 and which has a central aperture 53 with an axis 54 extending radially from the axis of the shafts 13 and 15. The apertures 53 respectively receive suitable bolts (not shown) which engage the outer end of the main portion 52 of the associated one of the inserts 51 and are fixed to the associated one of the shafts 13 and 15 so as to connect the associated one of the shoes 25 and 35 and the associated one of the drive shafts 13 and 15.

The inserts 51 each also include, at the radially inner ends thereof, a flange part or portion 57 which is buried within the outer portion 29 of the associated one of the shoes 25 and 35, which extends, with respect to the associated aperture axis 54, radially outwardly. Preferably, as shown in FIG. 3, the radial thickness of the cylindrical wall of the axially outer portion 29 of the shoes 25 and 35 is generally equal to the radial extent of the inserts 51.

In an alternate embodiment shown in FIG. 4, the radial thickness of the wall of the axially outer portion 29 of the shoes 25 and 35 is somewhat less than the radial extent of the inserts 51 and, in the area surrounding the inserts 51, the wall of the axially outer portion 29 of the shoes 25 and 35 is enlarged and formed so that the outer surface 31 of the axially outer portion 29 includes a part 59 which tapers radially outwardly to the radially outer end of the inserts 51.

While other constructions can be employed, in the particularly disclosed construction, the pair of shoes 25 and 35 are fabricated by being molded from reinforced plastic material. While other reinforcing can be employed, in the specifically disclosed construction, the plastic material is a thermosetting plastic and, more specifically, is a vinyl ester. While other constructions can be employed, in the particularly disclosed construction, the reinforcing for the shoes 25 and 35 is provided by a suitable reinforcing fiber material, such as glass fiber, carbon fiber, and/or kevlon fiber, which fiber material is previously fabricated into a generally tubular and cylindrical preform.

The shoes 25 and 35 can be molded by any suitable process and, preferably, are fabricated by using the —resin transfer molding process (RTM). During such fabrication, the reinforcing preform and the inserts 51 are initially located in proper position in the mold and the plastic resin is then injected into the mold. During curing, the resin and the metallic inserts are bonded together.

More particularly, and preferably, the shoes 25 and 35 are cast in a die or mold (not shown) including a stationary central die or mold member (not shown) which includes an outer cylindrical surface defining the inner annular surface of the shoes 25 and 35. In addition, the die or mold includes a circumferential series of die or mold segments or members (not shown) which are moveable radially relative to the central mold member between radially inwardly located molding positions and radially outwardly located retracted positions and which, when in the molding positions, complete the formation of a mold cavity and define the outer generally cylindrical surface of the shoes 25 and 35, as well as the axially spaced end or side surfaces of the shoes 25 and 35. Any suitable arrangement can be employed for guiding movement of the mold segments between the molding and retracted positions.

The moveable mold segments are moved from the retracted to the molding positions by an annular camming member or ring (not shown) which is displacable along the axis of the cylindrical aperture toward and away from the stationary central mold member and which includes an inclined camming surface which engages a complementary camming surface on the radially outer surface of the series of mold segments, whereby, axial movement of the camming ring toward the stationary mold member causes radial movement of the mold segments to the molding positions and axial movement of the camming ring away from the stationary mold member permits retraction of the mold segments to the retracted positions. Any suitable arrangement can be employed to provide for axial movement of the camming ring.

Each of the mold segments includes, along the inner surface thereof, an arcuately extending annual groove (not shown) which defines the axially spaced ends or sides of the shoes 25 and 35 and the outer cylindrical surface of the shoes 25 and 35. The groove is defined by spaced, radially inwardly extending flanges which, when the mold segments are on the molding positions, engage the central mold member to define the mold cavity. Each of the mold segments also includes a radially inwardly projecting pin (not shown) which enters into a complementary aperture in the stationary central mold member and which supports one of the inserts during molding. In this last regard, during molding, the previously mentioned fiberglass preform is located around the stationary central mold member and the inserts are located in the annular pins of the mold segments. Thereafter, the mold segments are displaced to the molding position, and a suitable resin, such as a vinyl ester, is injected into the mold or die cavity. After curing, the mold segments can be manually or otherwise displaced to the retracted positions and the molded shoe can be removed from the stationary central mold member.

Because resin transfer molding is well known, no further or more specific description is included. Alternatively, the shoes 25 and 35 can be molded using a compression or injection process. RTM is the preferred method because of the ability to control fiber placement and reinforcement which results in improved structural properties. If desired, the plastic resin can be pigmented or a gel coat and/or veil can be employed to provide a suitable as-molded finish.

Use of the disclosed composite plastic shoes 25 and 35 provides a desirable decrease in weight, thereby permitting an increase in rotational speed, while simultaneously providing improved fatigue life, improved balance, and corrosion resistance. Use of the metallic inserts 51 at the bolt locations improves fatigue life by eliminating fretting or delamination of the composite material beneath or around the bolts, while at the same time results in reduced costs, while providing improved tolerances. Furthermore, machining of the outer surface of the shoes 25 and 35 is not required. In addition, the stiffness and strength of the shoes 25 and 35 can be optimized by varying the amount or type of reinforcement.

Various of the features of the invention are set forth in the following claims.

We claim:

1. An elastomeric coupling for transmitting torque between two shafts approximately aligned on a shaft axis, said coupling comprising a composite member including an elastomeric center element, and a shoe fabricated from a reinforced plastic material and including a first portion bonded to and located within said center element, and a second portion extending axially from said first portion and from said center element and adapted to be connected to one of the shafts, and at least one metallic insert molded in said second portion, said insert including a main portion having a central aperture with an axis extending radially with respect to the axis of the shaft.

2. An elastomeric coupling in accordance with claim 1 wherein said shoe is reinforced with fiber material.

3. An elastomeric coupling in accordance with claim 2 wherein said fiber material is one of a glass material, a carbon material, and a kevlar material.

4. An elastomeric coupling in accordance with claim 1 wherein said plastic material comprises a thermoset resin.

5. An elastomeric coupling in accordance with claim 4 wherein said thermoset resin comprises a vinyl ester.

6. An elastomeric coupling in accordance with claim 1 wherein said center element is fabricated from polyurethane.

7. An elastomeric coupling in accordance with claim 1 wherein said second portion is generally cylindrical, and wherein said first portion is also generally cylindrical.

8. An elastomeric coupling in accordance with claim 1 wherein said second portion includes an outer surface, and wherein said insert also includes a flange part buried within said second portion and extending, with respect to the associated aperture axis, radially outwardly.

9. An elastomeric coupling in accordance with claim 1 wherein said central element includes, in a radial plane extending from and along the shaft axis, an inwardly opening generally U-shaped cross-section including a pair of spaced legs.

10. An elastomeric coupling for transmitting torque between two shafts approximately aligned on a shaft axis, said coupling comprising a composite member including an elastomeric center element having, in a radial plane extending from and along the shaft axis, an inwardly opening generally U-shaped cross-section including a pair of spaced legs, and first and second shoes extending in opposite axial directions from said center element, fabricated from plastic material reinforced with fiber material, and respectively including a tubular and cylindrical first portion bonded within and to said legs of said center element and including an outer end, a tubular and cylindrical second portion extending axially from said outer end of said tubular and cylindrical first portion and including an outer end, and a plurality of inserts molded in said second portion axially inwardly of said outer end of said second portion and in arcuately spaced relation within a circular array, and respectively including a main part, and a central aperture with an axis extending radially with respect to the shaft axis and adapted to receive a bolt which is adapted to be connected to one of the shafts.

11. An elastomeric coupling in accordance with claim 10 wherein said fiber material is one of a glass material, a carbon material, and a kevlar material.

12. An elastomeric coupling in accordance with claim 10 wherein said plastic material comprises a thermoset resin.

13. An elastomeric coupling in accordance with claim 12 wherein said thermoset resin comprises a vinyl ester.

14. An elastomeric coupling in accordance with claim 10 wherein said center element is fabricated from polyurethane.

15. An elastomeric coupling in accordance with claim 10 wherein said main part includes radially inner and outer ends, wherein said inserts each also include a flange part buried within said second portion of the associated one of said first and second shoes, extending from said inner end of said main part, and extending, with respect to the associated aperture axis, radially outwardly, wherein said second portion includes an outer surface, and wherein said outer end of said main part is located adjacent said outer surface.

16. An elastomeric coupling in accordance with claim 10 wherein said inserts are fabricated of powdered metal.

* * * * *